United States Patent [19]

Hegedus et al.

[11] Patent Number: 4,643,806
[45] Date of Patent: Feb. 17, 1987

[54] ELECTROCATALYTIC ENERGY CONVERSION AND CHEMICALS PRODUCTION

[75] Inventors: Louis Hegedus, Rockville, Md.; Costas G. Vayenas; James N. Michaels, both of Cambridge, Mass.

[73] Assignees: W. R. Grace & Co., New York, N.Y.; Massachusetts Institute of Technology, Cambridge, Mass.

[21] Appl. No.: 545,471

[22] PCT Filed: Nov. 15, 1982

[86] PCT No.: PCT/US82/01603

§ 371 Date: Oct. 3, 1983

§ 102(e) Date: Oct. 3, 1983

[87] PCT Pub. No.: WO83/02605

PCT Pub. Date: Aug. 4, 1983

Related U.S. Application Data

[63] Continuation-in-part of Ser. No. 345,146, Feb. 2, 1982, Pat. No. 4,463,065.

[51] Int. Cl.$^4$ ............................................. C25G 191/00
[52] U.S. Cl. .................................... 204/59 R; 429/13
[58] Field of Search ..................................... 204/78–80, 204/72, 67, 129, 101, 59 R; 429/17, 33, 39, 13

[56] References Cited

U.S. PATENT DOCUMENTS

| Re. 28,792 | 4/1976 | Ruka et al. | 204/1 T |
| 3,981,746 | 9/1976 | Bezaudun et al. | 429/33 |
| 4,272,336 | 6/1981 | Vayenas et al. | 204/59 R |
| 4,412,895 | 11/1983 | Lu | 204/129 |
| 4,457,809 | 7/1984 | Meshbesher | 204/59 |

OTHER PUBLICATIONS

Archer, D. H., Alles, J. J., English, W. A., Elikan, L., Sverdrup, E. F., and Zahradnik, R. L., in "Fuel Cell Systems", Adv. Chem. Series, R. F. Gould, ed. 1965, 47, 332.
Degan, T. F. and Wei, J., AIChE Journal 1979, 25(2), 338.
Degan, T. F. and Wei, J., AIChE Journal 1980, 26(1), 60.
Etsell, T. H. and Flengas, S. N., J. Electrochem. Soc. 1971, 118 (12), 1890.
Farr, R. D. and Vayenas, C. G., J. Electrochem. Soc. 1980, 127 (7) 1478.
Gur, T. M. and Huggins, R. A., J. Electrochem. Soc. 1979, 126, 1067.
Gur, T. M. and Huggins, R. A., Solid State Ionics 1981, 5, 563.
Lee, S. T. and Aris, R., Chem. Eng. Science 1977, 32, 827.
Roy, D. and Gidaspow, D., Chem. Eng. Science 1972, 27, 779.
Roy, D. and Gidaspow, D., Chem. Eng. Science 1974, 29, 2101.
Sigal, C. T. and Vayenas, C. G., Solid State Ionics 1981, 5, 567.
Stoukides, M. and Vayenas, C. G. in "Catalysis under Transient Conditions", ACS Symp. Series, No. 178, A. T. Bell and L. L. Hegedus, eds, 1982, 181.
Weissbart, J., Smart, W. H., and Wydeven, T., Aerosp. Med. 1969, 40, 136.
Debenedetti, P. G. and Vayenas, C. G., "Steady-State Analysis of High Temperature Fuel Cells", Chemical Engineering Science, vol. 38, No. 11, pp. 1817–1829, 1983.

Primary Examiner—R. L. Andrews
Attorney, Agent, or Firm—Edward J. Cabic

[57] ABSTRACT

Oxidation reactions and unsaturation producing reactions are disclosed to be carried out in a solid-state electrocatalytic reactor for electrolytic energy conversion and chemicals production. Additional reactions are disclosed to be carried out in a solid-state electrocatalytic cross flow monolith which has a high ion transport surface area per reactor volume. The additional reactions include selected oxidation reactions, selected addition reactions, electrolysis of steam to hydrogen, decomposition of nitric oxide to nitrogen and oxygen and the manufacture of aluminum from $Al_2O_3$ in a eutectic solution.

11 Claims, No Drawings

ELECTROCATALYTIC ENERGY CONVERSION AND CHEMICALS PRODUCTION

This application is a continuation-in-part of our earlier filed co-pending U.S. application Ser. No. 345,146, filed Feb. 2, 1982 now U.S. Pat. No. 4,463,065.

This invention relates to electrochemical reactions for energy and chemical productions and especially to improved yields that can be obtained when conducting the reactions using a cross-flow monolith reactor.

One of the emerging uses of solid-state electrocatalytic systems is in fuel cells to convert a significant portion of the Gibbs free energy change of exothermic reactions into electricity rather than heat. The thermodynamic efficiency of such power generating schemes compares favorably with thermal power generation which is limited by Carnot-type constraints.

Solid-electrolyte fuel cells, operating on $H_2$ or CO as the fuel, have been constructed and tested for years. For example, see Archer, Alles, English, Elican, Sverdrup, and Zahradnik in "Fuel Cell Systems", Adv. Chem. Series, R. F. Gould ed., pg. 32 (1965) and Etsell and Flengas in J. Electrochem. Soc., vol. 118 (12), pg. 1980 (1971). Similar devices have been used for steam electrolysis as disclosed by Weissbart, Smart, and Wydeven, in Aerosp. Med., vol. 40, pg. 136 (1969), for NO decomposition as disclosed by Gur and Huggins, in J. Electrochem. Soc., vol. 126 pg. 1067 (1979), and for methane synthesis from CO and $H_2$ as disclosed by Gur and Huggins in Solid State Ionics, vol. 5, pg. 567 (1981).

Zirconia cells with Pt catalyst-electrodes can also be used to convert ammonia to nitric oxide with simultaneous electrical energy generation as disclosed by Vayenas and Farr in Science, vol. 208, pg. 593 (1980) and by Sigal and Vayenas in Solid State Ionics, vol. 5, pg. 567 (1981). A number of other industrially important oxidations were proposed to be carried out in solid-state electrocatalytic reactors, such as the conversion of sulfur to $SO_2$ or $SO_3$ as described by Yang, Debenedetti, Britt, Vayenas, and Evans in Proc. Intern. Symp. on Process Systems Engineering, Tokyo, (1982), or such as ethylene epoxidation as described by Stoukides and Vayenas in "Catalysis under Transient Conditions", ACS Symp. Series, No. 178, Bell and Hegedus, eds., pg. 181 (1982).

The practical usefulness of these electrochemical converters is limited by their very low power densities, arising from their low ion-transfer surface area per unit reactor volume. Thus, although the use of thin solid electrolyte walls can lead to current densities on the order of 0.5 $A/cm^2$ of electrolyte surface, previous high-temperature fuel cells exhibited volume power densities only up to 300-400 W/l as described by Archer et al in "Fuel Cell Systems", Adv. Chem. Series, Gould ed. pg. 32 (1965) and by Federmann et al in DOE/ET/11305-T8 (1981). The commercial viabililty of electrocatalytic energy conversion systems could be enhanced if there is a significant increase of their volume power density. Similar considerations apply for obtaining high chemical conversions per unit volume. One needs to have high surface to volume geometries for the production of chemicals.

It is an object of this invention to obtain novel oxidation and unsaturation producing reactions.

It is a further object of this invention to obtain high yield electrocatalytic energy conversions and chemical productions.

It is a further object of this invention to utilize high surface to volume geometries in electrochemical reactors for the production of chemicals.

It is a further object of this invention to utilize a solid-state cross-flow monolith reactor to conduct electrochemical reactions.

These and further objects will become apparent as the description of the invention proceeds.

The electrochemical reactions of this invention may be considered as two parts. First there are the new oxidation and unsaturation producing reactions which can be performed using any type solid-state electrocatalytic reactor. Secondly, there are the generally known reactions which now can be carried out with much higher efficiencies by use of the special monolith cross-flow fuel cell reactor. This novel fuel cell reactor configuration is described in U.S. patent application Ser. No. 345,146, filed Feb. 2, 1982, now U.S. Pat. No. 4,463,065 the entire contents of which are incorporated herein by reference. This reactor is a cross-flow monolith made of a solid electrolyte such as yttria-stabilized zirconia.

Although cross-flow monoliths have been disclosed by Degnan and Wei in AIChE Journal, vol. 25(2), pg. 338 (1979) and in AIChE Journal, vol. 26(1), pg. 60 (1980), these disclosures have been as cocurrent and countercurrent reactor-heat exchangers. These heat exchangers have not been used for solid-state electrocatalytic reactors.

Using this specific novel cross-flow monolith electrocatalytic reactor we now disclose a wide range of reactions that can be employed. For example, oxidation reactions can be conducted such as, sulfur to $SO_2$ or $SO_3$, hydrogen sulfide to $SO_2$ or $SO_3$, sulfur dioxide to $SO_3$, ammonia to nitric oxide (NO), hydrogen to water, carbon monoxide to $CO_2$, methanol to formaldehyde, methanol to $CO_2$, alcohols having 2 or more carbon atoms to their oxidized products, paraffins to their oxidized products, alkyl-aromatics to their oxidized products, naphthalene to phthalic anhydride, benzene to maleic anhydride, butane to maleic anhydride, and butene to maleic anhydride.

Other reactions we consider useful for the cross-flow monolith reactor include reactions such as $NH_3+O_2+CH_4$ to HCN, $CO+H_2$ to higher hydrocarbons, $CO+H_2$ to partially oxidized hydrocarbons, and $CO+H_2$+olefins to higher hydrocarbons. Still further reactions include electrolysis of steam to $H_2$, decomposition of NO to $N_2$ and $O_2$ and manufacture of aluminum from $Al_2O_3$ in a eutectic solution.

As the other part of our invention we disclose novel electrochemical reactions to be carried out in solid-state electrocatalytic reactors regardless of their configuration. These novel electrochemical reactions include oxidation reactions such as mono-olefins having 4 or more carbon atoms to form oxygenated products such as epoxides, aldehydes, ketones, acids and anhydrides; olefins with two or more double bonds and having 4 or more carbon atoms to form oxygenated products such as epoxides, aldehydes, ketones, acids and anhydrides; aliphatic compounds having 4 or more carbon atoms to form oxygenated products such as epoxides, aldehydes, ketones, acids and anhydrides; and fuels having 4 or more carbon atoms such as mono-olefins, olefins with two or more double bonds and aliphatic compounds to form CO, $CO_2$ or $H_2O$.

Other novel reactions include unsaturation producing reactions such as aliphatic compounds having 4 or more carbon atoms to form olefins, and alkyl aromatic compounds where the alkyl group has 3 or more carbon atoms to form the corresponding olefin-substituted aromatic compound.

Having described the basic aspects of our invention the following examples are given to illustrate the operability of specific embodiments thereof. These examples are the result of early work in this area and do not represent the much more improved results which we expect would be obtained upon more carefully constructed equipment.

APPARATUS CONFIGURATION

Ribbed sheets made of yttria-stabilized zirconia were made according to the procedure set forth in Example 2 of our co-pending U.S. application Ser. No. 345,146, now U.S. Pat. No. 4,463,065. The sheets were first coated on both sides with a catalyst by applying a platinum ink (Bright Paltinum Ink, Engelhard A-3788 made by Engelhard Industries) to the surface and then heating to 800° C. This procedure was repeated two more times to obtain an electrically conductive, porous catalyst coating. Then nine of these catalyst coated ribbed sheets and one uncoated ribbed sheet were cemented together with the ribs of one touching the back of the other in an alternating pattern to form a monolith as generally shown in FIG. 4 of our co-pending application with the following differences. The fourth M1 plate on the bottom of the M1 section was an uncoated rib sheet. Furthermore, the second M3 plate, which is on the bottom of the assembly, was also arranged to have its ribs in the same direction as the ribs in the M3 plate above it.

This assembly was sealed into a Macor(TM) housing. The Macor(TM) material is made by Corning Glass Works. The housing is positioned on opposite sides of the monolith and serves as a reactant inlet on one side and product outlet on the other. The remaining opposite two sides are open to the atmosphere so that air containing oxygen is free to flow through these cross channels. The external electrical connections at the top and bottom are as follows. The conducting catalyst coating on the inside of the first, upper M1 channel of the assembly is connected with a silver wire to form one terminal of the reactor while the lower surface on the second M3 plate on the bottom is connected to another silver wire to form the other terminal. The intermediate plates within the reactor were electrically connected to form a circuit with the fourth uncoated M1 plate being bypassed.

The reactor unit was placed in a heated electric furnace and various reactant gases were fed into the unit. The unit was electrically connected to an exterior load. By varying the amount of load a voltage versus current profile was generated and from this the maximum power obtained was calculated. The volume of the active portions of the reactor was about 8 ml.

EXAMPLE 1

In this example the reactant gas fed into the reactor was 5% carbon monoxide (CO) in helium. The electric furnace was heated to 800° C. The maximum power obtained was 0.050 watts.

EAMPLE 2

In this example the reactant gas fed into the reactor was 10% hydrogen in helium. The electric furnace temperature was 840° C. and the maximum power obtained was 0.33 watts.

EXAMPLE 3

In this example the reactant gas fed into the reactor was 2.5% ammonia in helium. The electric furnace was maintained at 850° C. and the maximum power obtained was 0.84 watts.

In all three of these examples the concentration of the reactant gas in helium was quite low because of availability at the time of the gas mixtures. It is expected that with higher concentrations of reactant gases the monolith reactor would give a significantly better performance.

It is understood that the foregoing description is given merely by way of illustration and that many variations may by made therein without departing from the spirit of this invention.

What is claimed is:

1. A method of electrocatalytic energy production and electrosynthesis of chemicals comprising reacting in a solid-state electrocatalytic cross flow monolith formed of an oxygen ion-conducting electrolyte and having a high ion transport surface area per reactor volume an electrochemical reaction selected from the group consisting of:
    A. oxidation reactions selected from the group consisting of
        sulfur to $SO_2$ or $SO_3$,
        hydrogen sulfide to $SO_2$ or $SO_3$,
        methanol to formaldehyde,
        alcohols having 2 or more carbon atoms to their oxidized products,
        paraffins to their oxidized products,
        olefins to their oxidized products,
        alkyl-aromatics to their oxidized products,
        naphthalene to phthalic anhydride,
        benzene to maleic anhydride,
        butane to maleic anhydride, and
        butene to maleic anhydride;
    B. addition reactions selected from the group consisting of
        $NH_3 + O_2 + CH_4$ to HCN,
        $CO + H_2$ to higher hydrocarbons,
        $CO + H_2$ to partially oxidized hydrocarbons, and
        $CO + H_2 +$ olefins to higher hydrocarbons;
    C. decomposition of NO to $N_2$ and $O_2$; and
    D. manufacture of aluminum from $Al_2O_3$ in a eutectic solution.

2. A method according to claim 1, wherein the electrochemical reaction comprises the addition reaction of $CO + H_2$ to higher hydrocarbons.

3. A method according to claim 1, wherein the electrochemical reaction comprises the addition reaction of $CO + H_2$ to partially oxidized hydrocarbons.

4. A method according to claim 1, wherein the electrochemical reaction comprises the addition reaction of $CO + H_2 +$ olefins to higher hydrocarbons.

5. A method according to claim 1, wherein the electrochemical reaction comprises either the oxidation reaction of sulfur dioxide to $SO_3$ or the electrolysis of steam to $H_2$ and said solid-state electrocatalytic cross flow monolith comprises a plurality of stacked essentially planar parallel sheets of a fluid-impermeable solid electrolyte capable of transporting oxygen ions, each sheet possessing a plurality of parallel elongated channels separated by ribs, said sheets divided into first and second groups wherein the sheets of said groups are interposed in an alternate manner, the channels of said first group forming an angle with the channels of said second group, the channels of said first group having a catalytic, oxygen-dissociating material disposed therein and the channels of the second group having a catalyst for promoting oxidation reactions disposed therein and said reactor fitted with conductive means to transport electricity.

6. A method according to claim 1, wherein the electrochemical reaction comprises oxidation reactions selected from the group consisting of:
ammonia to nitric oxide (NO),
hydrogen to water,
carbon monoxide to $CO_2$, and
methanol to $CO_2$
and said solid-state electrocatalytic cross flow monolith comprises a plurality of stacked essentially planar parallel sheets of a fluid-impermeable solid electrolyte capable of transporting oxygen ions, each sheet possessing a plurality of parallel elongated channels separated by ribs, said sheets divided into first and second groups wherein the sheets of said groups are interposed in an alternate manner, the channels of said first group forming an angle with the channels of said second group, the channels of said first group having a catalytic, oxygen-dissociating material disposed therein and the channels of the second group having a catalyst for promoting oxidation reactions disposed therein and said reactor fitted with conductive means to transport electricity.

7. A method according to claim 5, wherein the electrochemical reaction comprises the oxidation reaction of ammonia to nitric oxide (NO).

8. A method according to claim 5, wherein the electrochemical reaction comprises the oxidation reaction of hydrogen to water.

9. A method according to claim 5, wherein the electrochemical reaction comprises the oxidation reaction of carbon monoxide to $CO_2$.

10. A method of electrocatalytic energy production and electrosynthesis of chemicals comprising reacting in a solid-state electrocatalytic reactor having an oxygen ion-conducting electrolyte and electrochemical reaction selected from the group consisting of
A. oxidation reactions selected from the group consisting of
mono-olefins having 4 or more carbon atoms to form oxygenated products selected from the group consisting of epoxides, aldehydes, ketones, acids and anhydrides;
olefins with two or more double bonds and having 4 or more carbon atoms to form oxygenated products selected from the group consisting of epoxides, aldehydes, ketones, acids and anhydrides;
aliphatic compounds having 4 or more carbon atoms to form oxygenated products selected from the group consisting of epoxides, aldehydes, ketones, acids and anhydrides; and
fuels having 4 or more carbon atoms selected from the group consisting of mono-olefins, olefins with two or more double bonds and aliphatic compounds to form CO, $CO_2$ or $H_2O$; and
B. unsaturation producing reactions selected from the group consisting of
mono-olefins having 4 or more carbon atoms to form olefins having 2 or more double bonds;
ethane to form ethene;
aliphatic compounds having 4 or more carbon atoms to form olefins; and
alkyl aromatic compounds where the alkyl group has 3 or more carbon atoms to form the corresponding olefin-substituted aromatic compound.

11. A method according to claim 10, wherein the electrochemical reaction is conducted in a solid-state electrocatalytic cross-flow monolith.

* * * * *